US011928478B2

(12) United States Patent
Stancil et al.

(10) Patent No.: US 11,928,478 B2
(45) Date of Patent: Mar. 12, 2024

(54) TRACKING DEVICE STATE TRANSITIONS (71) Applicant: Hewlett-Packard Development Company, L.P., Spring, TX (US)

(72) Inventors: Charles J. Stancil, Spring, TX (US); Isaac Lagnado, Spring, TX (US)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 75 days.

(21) Appl. No.: 17/635,540

(22) PCT Filed: Oct. 29, 2019

(86) PCT No.: PCT/US2019/058444
§ 371 (c)(1),
(2) Date: Feb. 15, 2022

(87) PCT Pub. No.: WO2021/086315
PCT Pub. Date: May 6, 2021

(65) Prior Publication Data
US 2022/0300295 A1 Sep. 22, 2022

(51) Int. Cl.
G06F 9/44 (2018.01)
G06F 9/4401 (2018.01)
G06F 21/81 (2013.01)

(52) U.S. Cl.
CPC .......... *G06F 9/4418* (2013.01); *G06F 21/81* (2013.01); *G06F 2221/2111* (2013.01)

(58) Field of Classification Search
CPC . G06F 9/4418; G06F 21/81; G06F 2221/2111
See application file for complete search history.

(56) References Cited

U.S. PATENT DOCUMENTS

| 6,693,585 | B1* | 2/2004 | MacLeod | G01S 5/0027 342/357.55 |
| 8,185,101 | B1 | 5/2012 | Wiseman et al. | |
| 8,296,554 | B2 | 10/2012 | Mirashrafi et al. | |
| 8,810,392 | B1 | 8/2014 | Teller et al. | |
| 8,866,607 | B2 | 10/2014 | Velusamy | |
| 9,848,299 | B1 | 12/2017 | Kumar et al. | |
| 10,423,926 | B1* | 9/2019 | Nagpal | H04W 4/38 |
| 2005/0149752 | A1* | 7/2005 | Johnson | G06F 21/88 726/4 |
| 2007/0241887 | A1 | 10/2007 | Bertagna et al. | |

(Continued)

FOREIGN PATENT DOCUMENTS

TW M319412 U 9/2007
TW M398123 U 2/2011
(Continued)

*Primary Examiner* — Zahid Choudhury
(74) *Attorney, Agent, or Firm* — Knobbe, Martens, Olson & Bear, LLP (57) ABSTRACT An example computing device includes a tracking device, an interface, a processor, and a controller. The interface including a power pin, a data pin, and a clock pin, where the interface is to couple the tracking device to the computing device via the power pin and the data pin, and the clock pin is disconnected from the tracking device. The controller is communicatively coupled to the processor and the interface, the controller is to control an operation of the tracking device via the data pin.

13 Claims, 3 Drawing Sheets (56) References Cited

U.S. PATENT DOCUMENTS

| | | | | |
|---|---|---|---|---|
| 2012/0160182 A1* | 6/2012 | So | ........................ | A01K 15/021 |
| | | | | 119/720 |
| 2015/0356862 A1* | 12/2015 | Daoura | .................. | G08C 17/02 |
| | | | | 340/12.5 |
| 2017/0005422 A1 | 1/2017 | So et al. | | |
| 2017/0016993 A1 | 1/2017 | Liu et al. | | |
| 2017/0168848 A1* | 6/2017 | Raman | .................. | G06F 9/4406 |

FOREIGN PATENT DOCUMENTS

| | | |
|---|---|---|
| TW | M585356 U | 10/2019 |
| WO | 2014/005004 A1 | 1/2014 |
| WO | 2018/217224 A1 | 11/2018 |

* cited by examiner

TRACKING DEVICE STATE TRANSITIONS

BACKGROUND

Tracking devices may be used to track a location of an object and/or a user. The tracking device may be attached to a personal object, such as keys or a mobile phone of a user.

BRIEF DESCRIPTION OF FIGURES

Various examples may be more completely understood in consideration of the following detailed description in connection with the accompanying drawings, in which.

DETAILED DESCRIPTION

Tracking devices may be physical devices used to tag and track locations of an attached device and/or a person associated with the attached device. Different operations of the tracking device may be activated via a physical button located on the tracking device. In certain non-limiting specific examples, a tracking device which is embedded in a computing device via an interface that includes a power pin, a data pin, and a clock pin. A controller of the computing device controls an operation of the tracking device via the data pin. In specific examples, the computing device enables activation of the tracking device in an operating system (OS) of the computing device and enables deactivation of the tracking device in a pre-boot environment of the computing device.

A user may attach a tracking device to or embed the tracking device within a variety of different objects. The location of the object and/or the attached or embedded tracking device may be tracked using an application installed on another device. Different actions of the tracking device may be activated by a physical button located on the tracking device. In various examples, a user may not be able to access a physical button of the tracking device as the tracking device is embedded within a chassis of a computing device that is portable. More specifically, a tracking device is embedded in the computing device via an interface and used to keep track of the computing device by wirelessly communicating with an application that is run on another device associated with the user. The computing device controls various operations of the tracking device via a data pin of the interface. In specific examples, the data pin is controlled by a controller of the computing device coupled to the interface. The control of the data pin provides a virtual button event to activate different operations of the tracking device. The virtual button event mimics a physical button on the tracking device which may be used to activate the tracking device, deactivate the tracking device, and/or other operations. An input to the computing device may cause the control of the various tracking device operations.

A specific example computing device includes a tracking device, an interface, a processor, and a controller. The interface includes a power pin, a data pin, and a clock pin. The interface may couple the tracking device to the computing device via the power pin and the data pin, and the clock pin is disconnected from the tracking device. The controller is coupled to the processor and the interface, and controls operation of the tracking device via the data pin. As described above, the control of operations may include initiating activation, deactivation, and/or various ringing operations. Although the above examples describe the controller being in control of the pins of the interface, examples are not so limited. For example, the processor may be coupled to the interface to control an operation of the tracking device via the data pin.

Other examples are directed to a non-transitory computer-readable storage medium that stores instructions, which are executed by a processor of a computing device to enable activation of a tracking device of the computing device in an OS of the computing device, disable deactivation of the tracking device in the OS, and enable the deactivation of the tracking device in a pre-boot environment of the computing device. In various additional examples, the activation of the tracking device in the OS is disabled in response to enablement of the deactivation of the tracking device in the pre-boot environment.

In various examples, state transitions of a tracking device, which is embedded in a computing device, are enabled and disabled in different operating environments of the computing device. As the tracking device is embedded in the computing device, the tracking device may not be able to support a physical button for enabling and/or disabling the state transitions. In some specific examples, deactivation of the tracking device may be enabled in a pre-boot environment of the computing device to provide a secure deactivation process in which a user has physical possession of the computing device in order to enable the deactivation. As a specific example, enabling deactivation in the pre-boot environment may avoid and/or mitigate an unwanted or malicious remote deactivation of the tracking device. To provide additional security, once the deactivation is enabled in the pre-boot environment, the deactivation may be enforced by the pre-boot environment overriding activation of the tracking device in the OS.

Figure 1:
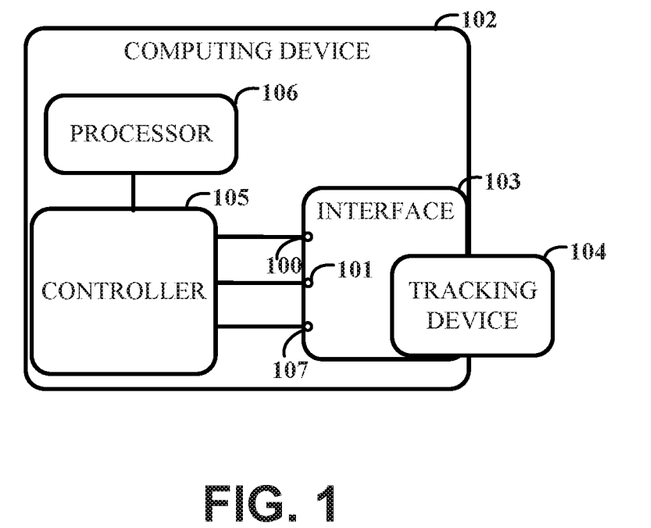
FIG. 1 illustrates an example computing device including a tracking device, consistent with the present disclosure.

Turning now to the figures, FIG. 1 illustrates an example computing device that includes a tracking device, consistent with the present disclosure. The computing device 102 may enable transitions of the tracking device 104 from a first state to a second state, and from the second state to the first state, in different operating environments.

The computing device 102 may be portable such that a user may freely move the computing device 102 to different locations. For example, the computing device 102 may be a laptop computer, a tablet computing device, a personal digital assistant (PDA) computer, or an electronic reader device, among other portable computers. As the computer device 102 is portable, it may be beneficial to track a location of the computing device 102 for a variety of purposes. For tracking locations of the computing device 102 and/or an associated user, the tracking device 104 may be embedded within the computing device 102. As an example, the user may lose the computing device 102 and use the tracking device 104 to locate the computing device 102. As another example, a log of locations of the tracking device 104 may be used to determine travel distances of the user.

The computing device 102 includes a processor 106, an interface 103, and a controller 105. The processor 106 may control operations of the computing device 102. In various examples, the computing device 102 further includes memory in communication with the processor 106. The memory may store data, including data associated with an OS of the computing device and/or a pre-boot environment for initiating the computing device. The memory may be implemented using non-volatile memory, such as hard disk drives, solid state storage, flash memory, and Electrically Erasable Programmable Read-Only Memory (EEPROM), among others. As used herein, a pre-boot environment may be implemented using instructions executable by the processor 106. The pre-boot environment may be executed prior to execution of the OS of the computing device 102. The pre-boot environment may initialize hardware components of the computing device 102 and may load the OS of the computing device 102. In some examples, the pre-boot environment may be implemented as platform firmware of the computing device 102. In some examples, the pre-boot environment may be implemented using unified extensible firmware interface (UEFI).

In some examples, the processor 106 may be implemented as a multi-core processor or a processor circuit implemented as a set of processor circuits integrated as a chip set. In these and other examples, it is appreciated that such processor circuitry includes a single, or multiple computer circuits including memory circuitry for storing and accessing the firmware or program code to be accessed or executed as instructions to perform the related operation(s).

As used herein, a controller refers to or includes a chip, an expansion card, or a stand-alone device that interfaces with the processor 106. In some non-limiting examples, the controller 105 may refer to or include an embedded controller, though examples are not so limited. In further and related examples, the controller 105 may include a Bluetooth (BT) controller that executes control over the operations of the tracking device 104. The operation of the tracking device 104, as well as the control there over, may be independent of the OS of the computing device 102 in a number of examples.

The interface 103 has a power pin 100, a data pin 101, and a clock pin 107. The interface 103 couples the tracking device 104 to the computing device 102 via the power pin 100 and the data pin 101, and the clock pin 107 may optionally be disconnected from the tracking device 104. The power pin 100, the data pin 101, and the clock pin 107 of the interface 103 are coupled to a system interface via data lines such that the system interface may assert signals over the power pin 100 and the data pin 101. The system interface may include the controller 105 and/or the processor 106. For example, the controller 105 is coupled to the interface 103, although examples are not so limited and the processor 106 may be coupled to the interface 103. As used herein, an interface includes or refers to a physical connection and/or hardware that physically connects components of the computing device 102. For example, the interface 103 may physically connect the controller 105 and/or processor 106 to the tracking device 104. In specific examples, the tracking device 104 includes an M.2 communications module having an antenna and wireless communication capabilities and the interface 103 includes an expansion slot, such as a wireless wide area network (WWAN) slot. However, examples are not limited to M.2 communications modules and expansion slots. As another example, the tracking device 104 may be soldered to the motherboard of the computing device 102. Additionally, although FIG. 1 illustrates a power pin 100, a data pin 101, and a clock pin 107, examples include sets of pins or connections for the illustrated pins 100, 101, 107.

The computing device 102, via the processor 106, may enable transitions of the tracking device 104 between first and second states in different operating environments. For example, the processor 106 may enable a transition of the tracking device 104 from a first state to a second state in a first operating environment and enable a transition from the second state to the first state in a second operating environment. The first state may include an activated state or a ready-to-activate state, and the second state may include a deactivated state. The first operating environment may include the pre-boot environment of the computing device and the second operating environment may include the OS of the computing device. In some examples, the first operating environment is executed prior to an execution of the second operating environment. The processor 106 may further disable transitions between the first and second states in the respective operating environments. As an example, the processor 106 may disable a transition from the second state to the first state during execution of the first operating environment, and disable a transition from the first state to the second state in and/or during the execution of the second operating environment.

In specific examples, the processor 106 enables and disables activation and deactivation of the tracking device 104 of the computing device 102 in the OS and in the pre-boot environment of the computing device 102. Enabling activation and/or deactivation in the pre-boot environment and/or in OS, as used herein, includes enabling the execution of the activation and/or deactivation of the tracking device 104 during execution of or in the operating environment of the pre-boot environment and/or the OS. Similarly, disabling activation and/or deactivation in the pre-boot environment and/or in OS, as used herein, includes disabling the execution of the activation and/or deactivation of the tracking device 104 during execution of and/or in the environment of the pre-boot environment and/or the OS. For example, the processor 106 may enable activation of the tracking device 104 of the computing device 102 in the OS of the computing device 102, disable activation of the tracking device 104 in the OS, and enable the deactivation of the tracking device 104 in the pre-boot environment of the computing device 102.

Responsive to the respective enabling and/or disabling, the system interface coupled to the interface 103 may assert a signal to the tracking device 104 via the data pin 101 to control the operation of the tracking device 104. In the example illustrated by FIG. 1, the controller 105 may assert a signal via the data pin 101 to the tracking device 104 to control the operation.

In various examples, the signal asserted via the data pin 101 may initiate activation of the tracking device 104. For example, the controller 105 may assert the signal via the data pin 101 to transition the tracking device 104 to a ready-to-activate state. In specific examples, the controller 105, which controls the data pin 101, may initiate the activation independent of the OS and during execution of the OS of the computing device 102.

In other examples (and/or in addition), the signal asserted via the data pin 101 may deactivate the tracking device 104. As described above, the deactivation may be enabled in the pre-boot environment, such as during execution of the pre-boot environment for booting up the computing device 102. The processor 106 may provide a start-up menu during a pre-boot process of the computing device 102 and deactivates the tracking device 104 in response to an input to the computing device provided during the pre-boot process. In related and more specific examples, the deactivation may be enabled in the pre-boot environment by an access to the start-up menu. For example, a user may press F10 during the boot-up operation, sometimes referred to as an "F10 setup access", and in response, the pre-boot environment provides the start-up menu. The start-up menu provides an option to deactivate the tracking device 104, which may be selected by the user to enable the deactivation of the tracking device 104. Once enabled, a button press or selection of F10 exit and save during the boot-up of the computing device 102 may deactivate the tracking device 104. The selection may be detected by the controller 105, and the controller 105 provides a message to the pre-boot environment. The pre-boot environment, in response, instructs the controller 105 to assert the signal on the data pin 101 to deactivate the tracking device 104.

Once deactivation of the tracking device 104 is enabled in the pre-boot environment, such as in the F10 setup access as described above, the activation of the tracking device 104 may be disabled in the OS by the pre-boot environment. The pre-boot environment may take precedence over the OS and/or otherwise avoid an activation of the tracking device 104 from occurring in the OS. As an example, once the deactivation is enabled, a button press or selection to activate the tracking device 104 is ignored by the pre-boot environment. The pre-boot environment may block a signal from being provided to the tracking device 104 over the data pin 101 responsive to the button press. In specific examples, the pre-boot environment may not be able to propagate the signal and/or may not be able to provide the signal to the controller 105, thereby causing the controller 105 to not propagate the signal to the tracking device 104 over the data pin 101.

The signals asserted on the data pin 101 may be different signals that cause the different operations of the tracking device 104. Examples of different signals include a toggle between high and low states on the data pin 101 for different amounts of time. A toggle between states, as used herein, may include a sequence pulse between high and low states. An example toggle for deactivation may include five 100 millisecond (ms) (low) pulses with 1.5 second delay between. In other examples, the deactivate signal may include a signal of 900 ms, such as toggling for 900 ms, and an activate signal may include a signal of 200 ms, such as toggling for 200 ms. However, examples are not so limited.

The signal over the data pin 101 may be provided in response to different inputs to the computing device 102. In a number of examples, the inputs include a button press and/or a computer-readable instruction. For example, the controller 105 may be coupled to an input device of the computing device 102 and identifies a button press input to the input device. The input device may include a keyboard, a computer mouse, a button on the device, and/or a touch screen. In a specific example, the controller 105 detects the button press via a key scan, identifies the button press is indicative of an instruction to control an operation of the tracking device 104, and controls the operation of the tracking device 104 by asserting the signal over the data pin 101.

In some examples and/or in addition, different button press combinations may cause control of the different operations of the tracking device 104. As an example, a first key combination may cause activation of the tracking device 104, such as a Shift+F11. A second key combination may cause a remote ring of another computing device, such as Shift+double press F11. A third key combination may cause deactivation of the tracking device 104, such as Shift+F10. A fourth key combination may cause ringing of the tracking device 104 to cease or mute. Although examples are not so limited, and in some examples, the button press combination that causes the activation of the tracking device 104 may cause a different operation once the tracking device 104 is activated. Examples of other operations of the tracking device 104 include operations associated with the ringing of the tracking device 104 ceasing or muting. In various examples, the pre-boot environment may override an activation signal in response to the deactivation being enabled in the pre-boot environment.

In other examples, the controller 105 detects the button press via the key scan, provides a message to the processor 106 indicative of the button press, and the processor 106, via the pre-boot environment, asserts the signal or provides a message back to the controller 105 to assert the signal. Similarly, the above operations may be triggered by a computer-readable instruction, which may be provided by an application running on the computing device 102.

The tracking device 104 may include a connector, a controller, and an antenna. The connector of the tracking device 104 couples to the interface 103 of the computing device 102, such that the tracking device 104 is embedded or integrated within the computing device 102. As a specific example, the interface 103 includes a socket to connect with the connector of the tracking device 104 and an interface, including the power pin 100 and the data pin 101, to provide communication between the controller 105 and the tracking device 104. The tracking device 104 may be powered independent of a power state of the computing device 102 via the power pin 100, such that the tracking device 104 may be powered in all power states of the computing device 102. The different power states may be associated with different functions of the computing device 102 being enabled and/or disabled, and which may result in different levels of power consumption by the computing device 102. As a specific example, the specifications of the Advanced Configuration and Power Interface (ACPI) define six power states from S0 state to S5 state, although examples are not so limited. In various examples, the tracking device 104 may be powered via the power pin 100 when the computing device 102 is in a back-up power state, such as the computing device 102 being in an off-state or in a sleep state. The tracking device 104 may be provided power via the power pin 100 while the computing device 102 is in the back-up power-state and has remaining battery life or stored energy in a battery of the computing device 102. As a specific example, the tracking device 104 is provided power while the computing device is in the off-state, and a user may locate the computing device 102 that is in the off-state using the tracking device 104. The tracking device 104 may provide an audible ring in response to communication with another computing device, as further described herein.

The controller of the tracking device 104 executes various computer-readable instructions to provide the different operations in response to the asserted signals. For example, the controller identifies the signal asserted over the data pin 101 of the interface 103, and revises a mode of operation between states in response to the signal. The specific mode of operation may be identified using operating state information stored on a memory of the tracking device 104. The controller may revise the mode of operation from an activated state to a deactivated state in response to the signal. In other examples, the controller revises the mode of operation from a deactivated state to a ready-to-activate state.

Once activated and/or in a ready-to-activate state, the tracking device 104 may communicate with other devices. An example device may include an additional computing device executing an application. The additional computing device may include a mobile phone, another laptop computer, a desktop computer, a smartwatch, a tablet, among other devices. The tracking device 104 wirelessly communicates with the additional computing device via the antenna and the controller of the tracking device 104. More specifically, the additional computing device may execute the application to communicate with the tracking device 104 and to determine a location of the tracking device 104 based on the communication. Additionally and/or alternatively, the tracking device 104 and/or additional computing device may output audible signals, sometimes herein referred to as "ringing", and which may be used by the user to locate the computing device 102 and/or additional computing device. The ringing of the tracking device 104 may be in response to a wireless signal from the additional computing device. The ringing of the additional computing device may be in response to a wireless signal from the tracking device 104.

As a specific example, the controller of the tracking device 104 may, in response to a particular signal asserted over the data pin 101, output a wireless signal to the additional computing device. The output wireless signal may cause the additional computing device to output an audible signal. In further examples and/or alternatively, the controller of the tracking device 104, in response to an asserted signal over the data pin 101, discontinues output of an audible signal. The asserted signals over the data pin 101 may include general-purpose IO (GPIO) signals and/or Inter-Integrated Circuit (I2C) signals, among other types of signals, which are provided in response to different inputs to the computing device 102.

The operations of the tracking device 104 may be independent of the OS of the computing device 102. As an example of the operations of the tracking device 104 being independent of the OS, the tracking device 104 may be deactivated without the use of the OS of the computing device 102. Further, to reduce the likelihood of potentially malicious attacks, access to the application running on the other computing device may be controlled to avoid leaking of the application into the public domain and/or malicious deactivation of the tracking device 104. For example, leaking of the application may be used by a malicious person to steal the laptop computer and/or cause issues for an associated company.

As the tracking device 104 is embedded in the computing device 102, the tracking device 104 may be unable to support a physical button to activate and/or deactivate the tracking device 104 due to location of the tracking device 104 within the chassis of the computing device 102. The processor 106 enabling and disabling deactivation in OS and the pre-boot environment, respectively, may allow for activation of the tracking device 104 and secure deactivation of the tracking device 104. As described above, once the deactivation is enabled in the pre-boot environment, activation of the tracking device 104 in the OS may be disabled.

As illustrated and discussed above in connection with FIG. 1 and elsewhere in the instant disclosure, various circuit-based structure is disclosed for carrying out specific acts or functions, as may be recognized in the figures and related discussion. Whether depicted as a block, module, device, system, or controller, for example, such circuit-based structure refers to or includes circuitry designed to carry the acts or functions as so described. As specific examples of such circuit-based structure, among others reference may be made to 105 and 438 of FIG. 1 and FIG. 4.

Figure 2:
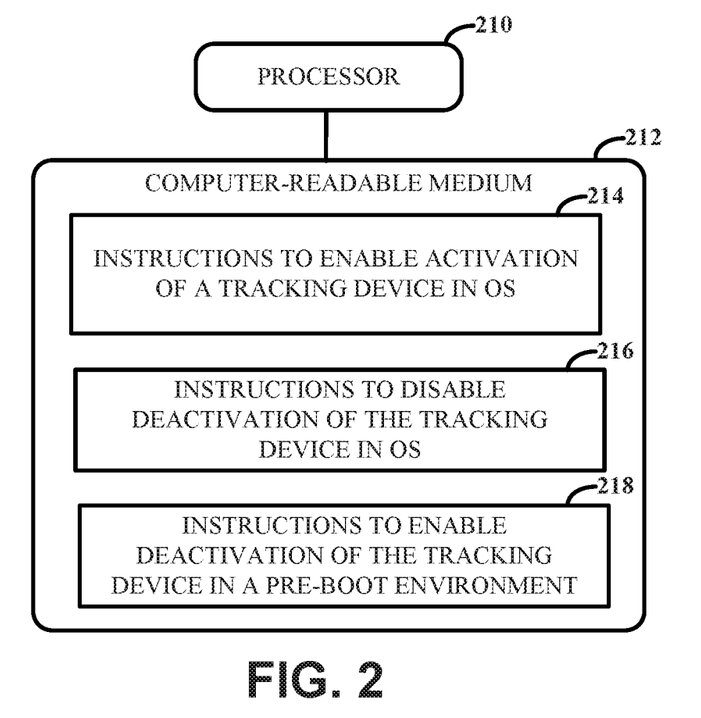
FIG. 2 illustrates an example computing device including non-transitory computer-readable medium storing executable instructions, consistent with the present disclosure.

FIG. 2 illustrates an example computing device including non-transitory computer-readable medium storing executable instructions, consistent with the present disclosure. The computing device may be portable, such as a tablet, and/or a laptop computer, and has a tracking device coupled to an interface of the computing device.

The computing device has a processor 210 and computer-readable medium 212 storing a set of instructions 214, 216, and 218. The computer-readable medium 212 may, for example, include ROM, RAM, EEPROM, Flash memory, a solid state drive, and/or discrete data register sets. At 214, the computing device may enable activation of a tracking device of the computing device in an OS of the computing device. The tracking device may be activated, once enabled, independent of the OS of the computing device by a controller of the computing device. For example, the controller of the computing device may be programmed to initiate the activation responsive to a particular button press. At 216, the computing device may disable deactivation of the tracking device in the OS. The disablement may include disallowing deactivation of the tracking device during execution of the OS and/or by the OS of the computing device. Similarly to the above, the controller (and/or other components of the computing device) may be programmed to disallow the deactivation during the execution of the OS. At 218, the computing device may enable the deactivation of the tracking device in the pre-boot environment of the computing device, such as by using the above-described start-up menu during a boot-up of the computing device. Although not illustrated, the computing device may disable the activation of the tracking device in the OS, such as by the pre-boot environment overriding the activation in response to the deactivation being enabled in the pre-boot environment.

In a number of examples, once the activation of the tracking device is enabled in the OS, the tracking device may be activated. For example, the computing device initiates the activation in response to a button press on a keyboard of the computing device and/or a computer-readable instruction. The button press may be identified by a controller of the computing device. In various examples, the controller detects the button press via a key scan and identifies the button press is indicative of an instruction to activate the tracking device. The controller may be directly connected to the data pin of the interface, such as an expansion slot, coupled to the tracking device and may control the data pin. In such examples, the controller asserts a signal over the data pin, such as toggling the data pin for a threshold period of time.

In other examples, the controller is not directly connected to the data pin. For example, the processor 210 may be connected to the data pin such that the pre-boot environment may assert control over the data pin. In such examples, in response to the detected button press and identification, the controller sends a message indicative of the button press to the processor 210. In response to the message, the processor 210 (via the pre-boot environment) asserts the signal over the data pin. The button press on the computing device effectively causes a virtual button event for the tracking device, which is similar to a user pressing a physical button on the tracking device. In such examples, the computing device may initiate activation of the tracking device responsive to a button press and during execution of the OS, and deactivate the tracking device in the pre-boot environment.

In other examples, the activation of the tracking device may be initiated in response to a computer-readable instruction. For example, the computer-readable instruction may be indicative of a request for the virtual button press. The computer-readable instruction is received by the pre-boot environment of the computing device, which either directly asserts the signal over the data pin or sends a request to the (embedded) controller to assert the data pin, as described above in connection to the button press examples. In such examples, the computing device may initiate activation of the tracking device in response to a computer-readable instruction and during execution of the OS, and deactivate the tracking device in the pre-boot environment.

As previously described, asserting the data pin may cause control of different operations of the tracking device. The pre-boot environment of the tracking device may recognize the particular asserted signal and initiate an operation. A specific signal may cause the tracking device to initiate activation. For example, the tracking device may enter a ready-to-activate mode of operation in response to the signal. Other operations of the tracking device may be activated. Example operations may include the tracking device discontinuing an output of an audible signal and/or to outputting a wireless signal to an additional computing device. The output wireless signal to the additional computing device may cause the additional computing device to output an audible signal, such as the above-described ringing.

In further examples, once the deactivation of the tracking device is enabled in the pre-boot environment and disabled in the OS, an activated tracking device may be deactivated. For example, the computing device may provide a start-up menu during a pre-boot process of the computing device. During the pre-boot process and in the start-up menu, a button press and/or a computer-readable instruction is provided to the computing device. Similarly to the above, the controller may detect the button press and provide a message to the pre-boot environment of the computing device. In response to the message indicative of the button press, the pre-boot environment (optionally via the controller) asserts a signal over the data pin. The asserted signal for the deactivation may include a different toggle than the signal for the activation. For example, the data pin is toggled a first threshold time to initiate activation and a second threshold time to initiate deactivation, with the first and second threshold being different. As the deactivation is enabled and/or caused by an input to the computing device during the pre-boot process, the deactivation process may be more secure than when the tracking device may be deactivated without physical access to the computing device and/or the tracking device. To provide further security, once the tracking device is disabled, the pre-boot environment may enforce the deactivation by blocking and/or overriding activation of the tracking device in the OS.

Figure 3:
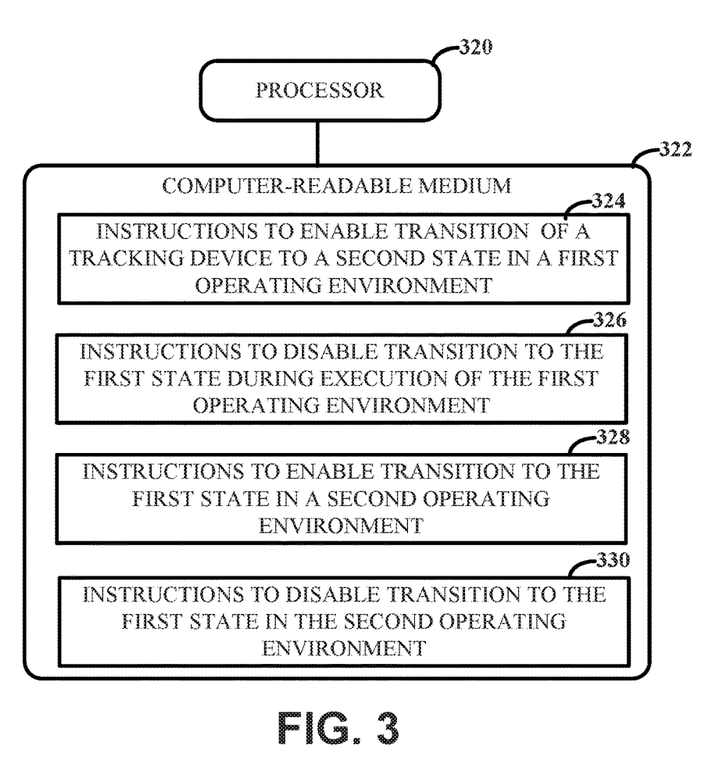
FIG. 3 illustrates an example computing device including non-transitory computer-readable medium storing executable instructions, consistent with the present disclosure.

FIG. 3 illustrates an example computing device including non-transitory computer-readable medium storing executable instructions, consistent with the present disclosure. The computing device may be portable, such as a tablet, and/or a laptop computer, and has a tracking device coupled to an interface of the computing device.

The computing device has a processor 320 and computer-readable medium 322 storing a set of instructions 324, 326, 328, 330. The computer-readable medium 322 may, for example, include ROM, RAM, EEPROM, Flash memory, a solid state drive, and/or discrete data register sets. At 324, the computing device may enable a first transition of a tracking device of the computing device from a first state to a second state in a first operating environment of the computing device. The first state may include an activated state and the second state includes a deactivated state or a ready-to-activate state. At 326, the computing device may disable a second transition from the second state to the first state during the execution of the first operating environment. At 328, the computing device may enable the second transition from the second state to the first state in a second operating environment of the computing device, wherein the first operating environment is executed prior to an execution of the second operating environment. The first operating environment may include a pre-boot environment and the second operating environment includes the OS of the computing device. At 330, the computing device may disable the second transition from the second state to the first state in the second operating environment. As described above, the first operating system may enforce the deactivation of the tracking device by overriding a button press or computer-readable instruction to activate the tracking device. As described above, in various examples, the first operating environment may provide a signal to the tracking device, which may be asserted via the first operating environment directly using the processor 320 or indirectly using a controller in communication with the processor 320, to transition the tracking device to the second state during a boot-up operation of the computing device.

Figure 4:
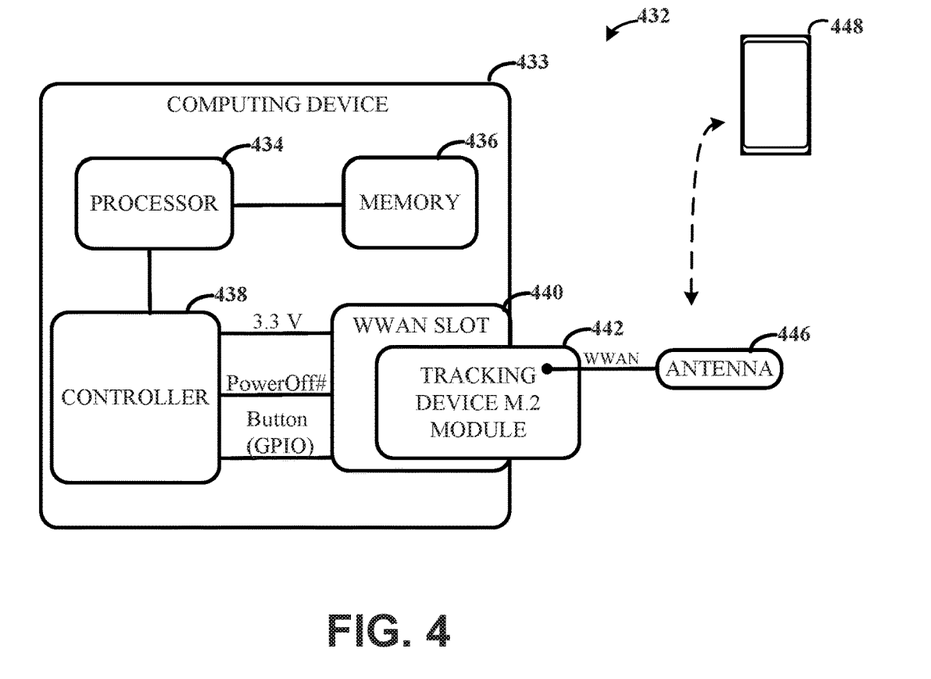
FIG. 4 illustrates an example system that includes a computing device and a tracking device, consistent with the present disclosure.

FIG. 4 illustrates an example system that includes a computing device and a tracking device, consistent with the present disclosure. The system 432 includes a computing device 433 and an additional computing device 448. The computing device 433 contains a tracking device 442 which may communicate with the additional computing device 448.

As previously described, the tracking device 442 is embedded in the computing device 433 via an expansion slot 440 of the computing device 433. In the specific example illustrated by FIG. 4, the expansion slot 440 includes a WWAN M.2 slot and the tracking device 442 includes an M.2 communications module with an antenna 446 for communicating to other devices, such as the illustrated additional computing device 448. As previously described, examples are not limited to expansion slots and the tracking device 442 may be soldered directly to the main circuit board of the computing device 433.

The additional computing device 448 may be executing an application for identifying a location of the tracking device 442 and/or otherwise tracking the tracking device 442. In specific examples, the wireless communication may be limited by a distance between the tracking device 442 and the additional computing device 448

The computing device 433 further includes a processor 434, a memory 436, and a controller 438, as previously described in connection with FIG. 1. The memory 436 may store instructions associated with the OS of the computing device 433 and the pre-boot environment, which are executed by the processor 434. In the specific example, the controller 438 is coupled to the expansion slot 440 and the respectively associated power pin, the data pin, and the clock pin. As described above, the processor 434 may enable activation of the tracking device 442 in OS, disable deactivation (and/or activation) of the tracking device 442 in the OS, and enable deactivation of the tracking device 442 in the pre-boot environment.

Responsive to the enablement and/or disablement of the activation and deactivation by the processor 434, the controller 438 may control different operations of the tracking device 442 by asserting a signal over the data pin, illustrated in FIG. 4 as the Button (GPIO). In the specific example, a Button (GPIO) signal is provided over the data pin by the controller 438.

Various inputs to the computing device 433 cause the controller 438 to control the operation of the tracking device 442. For example, different key strokes on a keyboard and/or touch screen keyboard, sometimes herein referred to as a "button press", may cause the control of the different operations. As previously described, when the tracking device 442 is (first) embedded to the computing device 433 via the expansion slot 440, the tracking device 442 may be in a deactivated state. The tracking device 442 is activated in response to the input to the computing device 433. For example, the tracking device 442 may transition from the deactivated state to a ready-to-activate state. The input causes the signal over the data pin to be transmitted to the tracking device 442 by the controller 438. The signal may be referred to as a button signal as the signal is indicative of a user pressing a physical button on the tracking device 442.

As a specific example, a Button (GPIO) signal may be asserted when the user presses the Shift+F11 (wireless enable/disable) key combination on a keyboard of the computing device 433. This action is detected by the controller 438 of the computing device 433, which then toggles the Button (GPIO) signal for a first threshold period of time, such as 200 ms. In other examples, the controller 438 propagates a unique virtual button event to the pre-boot environment of the computing device 433 in response to the detected key combination. The pre-boot environment receives the virtual button event and toggles the Button (GPIO) signal via the processor 434 for the first threshold period of time, such as 200 ms. The above-described operations are not limited to being in response to a button press, and may be initiated in response to a computer-readable instruction, as further described herein.

The tracking device 442 detects the Button (GPIO) signal, and may initiate an operation in response to the identified Button (GPIO) signal. A first example operation includes transitioning from the deactivated state to a ready-to-be activated state. When the tracking device 442 is first used and/or in the deactivated state, the tracking device 442 may not be associated with a user account of the user and/or a particular application. In a specific example, to associate the tracking device 442 with the user account, the tracking device 442 is activated using a single Shift+F11 key press on a keyboard of the computing device 433 which places the tracking device 442 into the ready-to-be activated state. The tracking device 442 is registered and associated with the user account using the application which may be executed by the additional (separate) computing device 448 in communication with the tracking device 442.

Another example operation includes remote ringing of the additional computing device 448 that is executing the application. For example, once the tracking device 442 is activated, a Shift+double press of F11 (hold down SHIFT and double press the F11 key) may cause an output of a wireless signal to the additional computing device 448 that causes the additional computing device 448 to output an audible tone/ring, if the additional computing device 448 is within a threshold distance. The threshold distance is sometimes referred to as being in BT proximity, which may be approximately 200 feet.

Another example operation is muting a ringing of the tracking device 442. For example, if the additional computing device 448 attempts to locate the computing device 433 via the application, and the tracking device 442 and the computing device 433 and additional computing device 448 are within the threshold proximity, the tracking device 442 may output an audible tone/ring. The ring, which includes an output of an audio signal, may notify the user of the location of the computing device 433. A single Shift+F11 key press on the computing device 433 may cause the tracking device 442 to cease ringing, in a specific example.

A further example operation includes deactivating the tracking device 442. This may be accomplished through an F10 Setup option in a pre-boot environment of the computing device 433. As such, the deactivation of the tracking device 442 may involve physical access to the computing device 433, resulting in increased security as compared to remotely accessing the tracking device 442 to deactivate. The deactivation process may be further strengthened, security-wise, by having a password protect access to the F10 Setup menu. When the user or an administrator has access to F10 Setup menu, a "Deactivate laptop tracking" option may be selected. The pre-boot environment may provide the Button (GPIO) signal for a threshold period of time, which may be longer than the activation in some examples. For example, the Button (GPIO) signal may be toggled for around 900 ms to deactivate the tracking device 442. The Button (GPIO) signal for deactivating, in such examples, may be referred to as a "long press" which may be issued during the F10 setup and may not be through the Shift+F11 mechanism while the OS of the computing device 433 is running. The long press is decoded by the controller of the tracking device 442 which causes the tracking device 442 to return to a ready-to-activate state. Once the deactivation is enabled in the pre-boot environment, the pre-boot environment may enforce the deactivation by disabling the activation in the OS, as described above. The above provides example inputs and example signals that cause different operations of the tracking device 442, however examples are not limited to the specifically described computing device inputs and/or tracking device operations.

Although the above describes the controller 438 asserting the signal over the data pin to the tracking device 442, and in response to a button press, examples are not so limited. For example, the processor 434 may be directly coupled to the expansion slot 440 and asserts the signal.

FIGS. 5A-5D illustrate example flowcharts for activation of an embedded tracking device, consistent with the present disclosure. As described above, in different examples, the data pin of the interface is controlled by the processor of the computing device and, in other examples, is controlled by the controller in communication with the processor. Additionally, signals may be asserted over the data pin to the tracking device in response to button presses or in response to computer-readable instructions.

Once the OS of the computing device is operational, an application may be provisioned in the computing device. The application may be executed and used to guide a user through activating the tracking device and/or other operations. For example, a graphical user interface provides a visual instruction to the user that guides the user to provide a button press and/or another input on the display to select that causes a computer-readable instruction to the computing device indicative of a virtual button press.

Figure 5A:
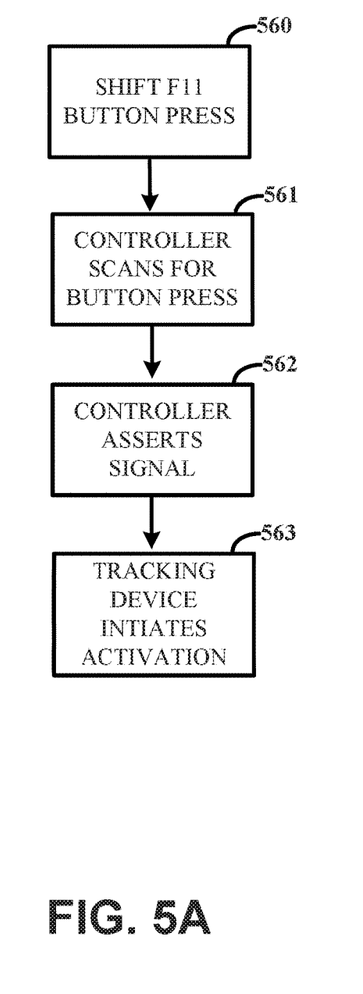
FIGS. 5A-5D illustrate example flowcharts for activation of an embedded tracking device, consistent with the present disclosure.

FIG. 5A illustrates a first example flowchart for initiating activation of a tracking device coupled to an interface of a computing device in response to a button press. At 560, a user may press a button press combination, such as the illustrated Shift+F11. At 561, the controller scans for the button press, and in response to detecting the same, at 562, asserts a signal over the data pin, such as a GPIO signal. In response to the asserted signal, at 563, the tracking device initiates activation by transitioning from a deactivated state to a ready-to-activate state. In such an example, the controller has access to key scan and controls the data pin directly, such as the GPIO being part of an embedded controller chip.

Figure 5B:
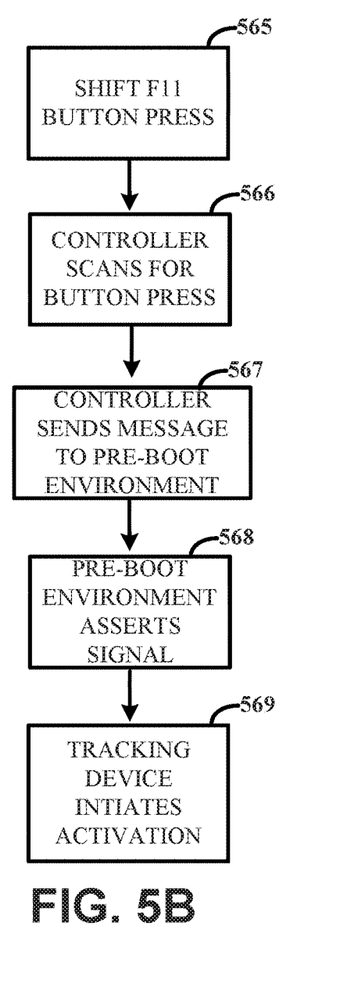

FIG. 5B illustrates a second example flowchart for initiating activation of a tracking device coupled to an interface of a computing device in response to a button press. At 565, a user may press a button press combination, such as the illustrated Shift+F11. At 566, the controller scans for the button press, and in response to detecting the same, at 567, the controller sends a message to the pre-boot environment of the computing device. The message may be indicative of the button press. In response to the message, at 568, the pre-boot environment asserts a signal over the data pin, such as a GPIO signal. In response to the asserted signal, at 569, the tracking device initiates activation by transitioning from a deactivated state to a ready-to-activate state. In such an example, the controller has access to key scan and the pre-boot environment has control of the data pin, such as control of a GPIO different chip.

Figure 5C:
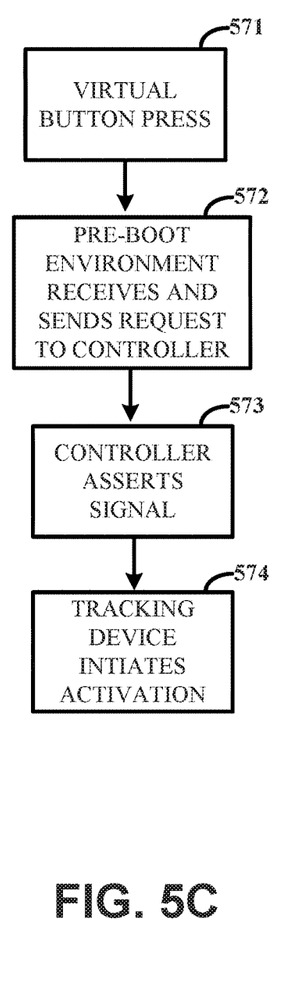

FIG. 5C illustrates a third example flowchart for initiating activation of a tracking device coupled to an interface of a computing device in response to a computer-readable instruction. At 571, a request for a virtual button press is received by the computing device. The request may include a computer-readable instruction provided by an application being executed by the computing device and that is indicative of the virtual button press. At 572, the pre-boot environment receives the request for the virtual button press and sends a request to the controller to assert a signal over the data pin. In response to receiving the request, at 573, the controller asserts the signal over the data pin. In response to the asserted signal, at 574, the tracking device initiates activation by transitioning from a deactivated state to a ready-to-activate state. In such an example, the controller has access to key scan and controls the data pin directly.

Figure 5D:
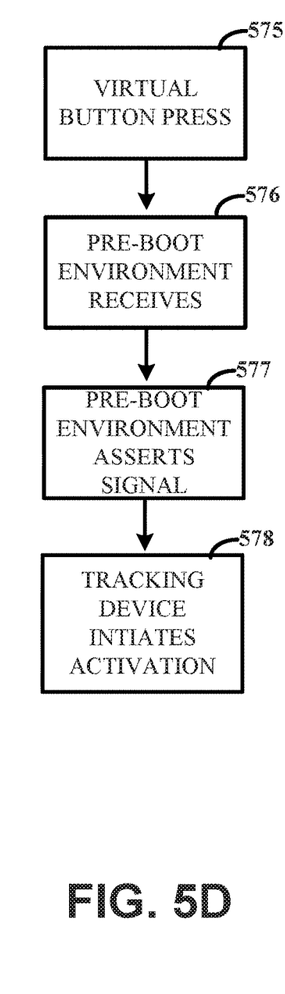

FIG. 5D illustrates a third example flowchart for initiating activation of a tracking device coupled to an interface of a computing device in response to a computer-readable instruction. At 575, a request for virtual button press is received by the computing device, such as an application that provides the request to the pre-boot environment of the computing device. At 576, the pre-boot environment receives the request for the virtual button press and in response, at 577, the pre-boot environment asserts a signal over the data pin. In response to the asserted signal, at 578, the tracking device initiates activation by transitioning from a deactivated state to a ready-to-activate state. In such an example, the pre-boot environment has control of the data pin.

In further and related examples, the deactivation may not be limited to being triggered by a button press. For example, similarly to the activation as described by FIGS. 5C-5D, a computer-readable instruction may be provided to trigger the deactivation of the tracking device.

The above use of asserting signals over a data pin for activating, deactivating, and other actions of the tracking device allows for interactions with a tracking device embedded in a computing device, such that there is an absence of access to a physical hardware button on the tracking device. The tracking device may be deactivated in a secure manner using the authorized access to the computing device. The deactivation process allows for seamless manageability capability, since the "deactivation" feature resides in the pre-boot environment F10 state and may leverage management tools to control the state of the embedded tracking device. Once the deactivation is enabled in the F10 state, activation of the tracking device in the OS may be disabled.

What is claimed is:

1. A computing device comprising:
   a tracking device;
   an interface including a power pin, a data pin, and a clock pin, wherein the interface is to couple the tracking device to the computing device via the power pin and the data pin, and the clock pin is disconnected from the tracking device;
   a processor; and
   a controller communicatively coupled to the processor and the interface, the controller to control an operation of the tracking device via the data pin,
   wherein the computing device is to enable activation of the tracking device during execution of an operating system (OS) of the computing device, to disable deactivation of the tracking device during execution of the OS, and to enable deactivation of the tracking device only during execution of a pre-boot environment of the computing device.

2. The computing device of claim 1, further including an input device coupled to the controller, and the controller is to:
   identify a button press that is input to the input device, and
   control the operation of the tracking device via the data pin and independent of an operating system of the computing device in response to the button press.

3. The computing device of claim 1, wherein the controller is to assert a signal via the data pin to control the operation, and the tracking device is to transition to a ready-to-activate state in response to the asserted signal.

4. The computing device of claim 1, wherein the tracking device is powered via the power pin, the power being provided to the tracking device while the computing device is in a back-up power state.

5. The computing device of claim 1, wherein the processor is to:
   provide a start-up menu during a pre-boot process of the computing device; and
   deactivate the tracking device in response to an input to the computing device provided during the pre-boot process.

6. The computing device of claim 1, wherein the tracking device is an M.2 communications module and the interface is an expansion slot.

7. A non-transitory computer-readable storage medium comprising instructions that when executed cause a processor of a computing device to:
   enable activation of a tracking device of the computing device during execution of an operating system (OS) of the computing device;
   disable deactivation of the tracking device during execution of the OS; and
   enable the deactivation of the tracking device during execution of a pre-boot environment of the computing device, wherein the pre-boot environment is executed prior to loading the OS.

8. The non-transitory computer-readable medium of claim 7, the instructions further executable to:
   initiate activation of the tracking device responsive to a button press and during execution of the OS; and
   deactivate the tracking device in the pre-boot environment.

9. The non-transitory computer-readable medium of claim 7, the instructions further executable to:
  initiate activation of the tracking device responsive to a computer-readable instruction and during execution of the OS; and
  deactivate the tracking device, by the pre-boot environment.

10. The non-transitory computer-readable medium of claim 7, wherein the instructions when executed further cause the processor to enable the activation during the execution of the OS, and wherein the tracking device is activated independent of the OS by a controller of the computing device.

11. A non-transitory computer-readable storage medium comprising instructions that when executed cause a processor of a computing device to:
  enable a first transition of a tracking device of the computing device from a first state to a second state during execution of a first operating environment of the computing device;
  disable a second transition of the tracking device from the second state to the first state during execution of the first operating environment;
  enable the second transition from the second state to the first state during execution of a second operating environment of the computing device, wherein the first operating environment is executed prior to the execution of the second operating environment; and
  disable the first transition from the first state to the second state during the execution of the second operating environment.

12. The non-transitory computer-readable medium of claim 11, wherein the second state includes a deactivated state and the first state includes an activated state, and the first operating environment includes a pre-boot environment and the second operating environment includes an operating system of the computing device.

13. The non-transitory computer-readable medium of claim 11, wherein the first operating environment includes a pre-boot environment, and the pre-boot environment provides a signal to the tracking device to initiate the first transition to the second state during a boot-up operation of the computing device, the second state includes a deactivated state.

* * * * *